Patented Aug. 17, 1943

2,326,956

UNITED STATES PATENT OFFICE 2,326,956

PROCESS AND MATERIAL FOR THICKENING LATEX AND LIKE MATERIALS

Gerry Mack, Jackson Heights, N. Y., assignor to Advance Solvents and Chemical Corporation, a corporation of New York No Drawing. Application July 16, 1940, Serial No. 345,763

11 Claims. (Cl. 260—815)

The invention relates in general to the treatment of aqueous dispersions of rubber and the like, and more particularly to a process and to materials for thickening latex.

The term latex used herein is to be understood to include natural crude and vulcanized latex or materials analogous to latex, such as synthetic materials which bear a similarity to latex in properties. The latex may be preserved with the usual preservatives such as ammonia or fixed alkalis and may be either of natural strength or concentrated.

The use of various agents known to the prior art has usually been accompanied by many disadvantages. Some of the agents employed for this purpose affect adversely the properties of the finished goods when the latex is used thereon for coating purposes. Accordingly, it is one of the objects of my invention to provide a thickening agent for materials such as latex and the like which will not adversely affect the properties of goods on which this material may be used.

Again another disadvantage of the thickening agents used hereinbefore has been the fact that a number of these agents rendered the latex itself unstable, with consequent difficulties in processing. Accordingly, it is another of the objects of my invention to provide a thickening agent and a process for thickening rubber latex and the like materials which will not render the latex or the like material unstable.

Another of the disadvantages of the materials used as thickening agents, as disclosed in the prior work along this line, is that the resultant yielded product had present therein a fair amount of the thickening agent itself. Accordingly, it is another of the objects of my invention to provide a thickening agent and a process for thickening latex and the like materials in which the resultant mixture contains a negligible amount of the thickening agent.

My invention in general comprises processing and thickening latex or like products by admixing therewith alkali soluble acid cellulose esters of dicarboxylic acids, or the water soluble salts of such esters, such as for instance an acid cellulose acetate dicarboxylate which has been converted into the corresponding water soluble salt by the addition of an alkali.

For example, the usual concentrated latex is of a very fluid consistency, but by the addition of selected quantities of a water soluble salt of an acid cellulose acetate dicarboxylate this consistency can be altered to any desired degree up to that of a thick paste, with only a small amount of the extraneous matter present. For example, about .6% to 1.2% on the dry rubber solids present is usually sufficient for the thickening of latex for all practical purposes, but larger quantities may be used if desired.

The use of even smaller quantities of the water soluble salts of cellulose dicarboxylates in a process for creaming latices and the like is described and claimed in my copending U. S. application Ser. No. 372,840 filed on January 2, 1941.

The preparation of the acid cellulose esters of dicarboxylic acids and of their salts has been described in various United States patents, and also in the "Industrial and Engineering Chemistry" magazine for the month of March, 1940, by Malm & Fordyce. It will be appreciated that while these materials themselves have been known there has been no disclosure as to the use of these esters or salts in a process or as an agent for thickening rubber latex.

In the present specification the terms "acid cellulose acetate ester of a dicarboxylic acid" and "acid cellulose acetate dicarboxylate" are both used to designate an ester of cellulose acetate such as is obtained by the combining of a dicarboxylic acid or its anhydride with a cellulose acetate having at least one free hydroxyl group, the dicarboxylic acid being typified by phthalic acid, but not necessarily limited thereto. For instance, other acids, such as succinic acid, can be used, and it should be understood that I do not limit myself to the use of the phthalic class of acids.

The alkalis which may be used to react with such esters to produce a water soluble derivative of the ester may be, for example, such as sodium hydroxide, sodium bicarbonate, or ammonium hydroxide. The alkaline materials such as the organic amines of the class of triethanolamine, morpholine and similar derivatives can also be employed. It should be appreciated, however, that these are merely mentioned as examples, and other types of alkalis may be used without departing from the spirit and scope of my invention.

The ammonium salt of the ester has been found to be particularly adaptable and feasible for use in this process, as such derivatives decompose slowly with aging or forced drying to decompose the ammonium salt to ammonia, and the resulting ester left is then no longer water soluble and this does not affect the moisture resistance of the finished article in which the rubber or latex or its equivalent is used.

The following examples may serve to illustrate without limiting the invention.

Example 1

A material which was particularly suitable for thickening latex and analogous materials, was prepared as follows:

To 79 parts by weight of water there is added 6 parts by weight of 26° Bé. ammonia To the resulting ammonia solution, there were added 15 parts by weight of dry, granular, water-insoluble, cellulose acetate hydrogen phthalate. The ammonia solution reacted with the acid cellulose ester to form a water soluble salt of the cellulose ester in th form of a viscous solution, which was usable for the purpose of thickening the rubber latex or analogous materials and contained the following components:

| | Per cent |
|---|---|
| Cellulose acetate hydrogen phthalate | 15 |
| Ammonium (26° Bé.) | 6 |
| Water | 79 |
| | 100 |

Relatively small additions of such water-soluble, cellulose ester salts to a concentrated rubber latex having e. g. a solids content of about 60% produced large increases in the viscosity of the treated condition had a very fluid consistency and a low viscosity. Thus that the addition of as little as 0.9 part by weight of cellulose acetate hydrogen phthalate in the form of its ammonium salt to a quantity of rubber latex containing 100 parts by weight of rubber solids produced a mixture of a semi-pasty consistency which was very greatly increased in viscosity as compared to the untreated latex.

The so-called thickened latex displayed good stability, and both the stability and consistency remained constant for many weeks.

Example 2

The use of the materials hereinbefore described as thickening agents were used with a form of vulcanized latex of approximately 58% rubber content, and which is known to the trade as "Vultex." A very considerable increase in the viscosity of the latex was observed and the stability and consistency of the thickened product remained constant over a period of weeks.

Example 3

About 5 parts by weight of the thickening agent solution described above were added to 100 parts by weight of "normal" latex which had a natural solids content between 38% and 42%. The thickening in this case was appreciable, although not as pronounced as with the latex having a solids content of 60% by weight. Even this smaller thickening effect was more than had been expected since most of the so-called thickening agents for latex have very little effect, if any, on the viscosity of latices with a natural rubber content between 38% and 42%.

Example 4

A latex-thickening agent mixture was compounded as follows:

| | Parts by weight |
|---|---|
| Concentrated latex (60%) | 166 |
| 10% solution of ammonium salt of cellulose acetate hydrogen phthalate | 30 |
| Clay | 25 |
| Zinc oxide | 5 |
| Sulphur | 1 |
| "Butyl Zimate" | 1 |

This compound prepared in the normal manner by suitable dispersion methods yields a thickened mixture suitable for making dipped articles such as gloves and the like. By using such a thickening material the deposit obtained for each dip of the article is about twice as great as that produced when the dip is made in an untreated mixture.

An ammonium salt of a cellulose dicarboxylate has been used in the examples given, but it should be understood that I do not limit myself to the use of these particular salts as any other water soluble salt of such an ester, such as for example a morpholine salt or a sodium salt, as well as the alkali soluble acid cellulose dicarboxylates themselves, are fully usable. These all produce the desired thickening effect when mixed with latex and the like products, but the advantage of the ammonium and other similar salts is that these salts decompose in the dried rubber film to form or to revert to water insoluble cellulose products which do not detract from the water resistance of the dried film.

While the examples cited as illustrations of my invention demonstrate the use of natural rubber latex, it should be understood that this process is equally adaptable so far as latices and like products are concerned, whether they be concentrated either by creaming or centrifuging, or whether they be vulcanized or unvulcanized, or whether they be stabilized with preservatives of any kind. Synthetic latices composed of dispersions of synthetic rubber substitutes or of natural rubber or the like redispersed in water also are usable.

What I claim is:

1. A process for thickening an aqueous dispersion of rubber and the like materials comprising the step of admixing with a quantity of the dispersion containing 100 parts by weight of solids at least about 0.6 part by weight of a thickening agent selected from the group consisting of the alkali soluble acid cellulose dicarboxylates and their water soluble salts.

2. A process, as claimed in claim 1, in which the ammonium salt of a cellulose dicarboxylate is used as thickening agent.

3. A process, as claimed in claim 1, in which an alkali metal salt of a cellulose dicarboxylate is used as thickening agent.

4. A process, as claimed in claim 1, in which an organic base salt of a cellulose dicarboxylate is used as thickening agent.

5. A process, as claimed in claim 1, in which a water soluble salt of a cellulose acetate dicarboxylate is used as thickening agent.

6. A process, as claimed in claim 1, in which a water soluble salt of an acid cellulose ester of a dibasic aryl acid is used as thickening agent.

7. A process, as claimed in claim 1, in which a water soluble salt of an acid cellulose ester of a dibasic alkyl acid is used as thickening agent.

8. A process, as claimed in claim 1, in which a water soluble salt of a cellulose acetate phthalate is used as thickening agent.

9. A process, as claimed in claim 1, in which a water soluble salt of a cellulose acetate succinate is used as thickening agent.

10. A process, as claimed in claim 1, in which cellulose acetate ammonium phthalate is used as thickening agent.

11. An aqueous dispersion of rubber and the like materials which has been thickened by means of a thickening agent selected from the group consisting of the alkali soluble acid cellulose dicarboxylates and their water soluble salts.

GERRY MACK.